United States Patent
Ang et al.

(10) Patent No.: US 10,181,633 B2
(45) Date of Patent: Jan. 15, 2019

(54) PREFORMED ANTENNA WITH RADIO FREQUENCY CONNECTORS FOR DOWNHOLE APPLICATIONS

(71) Applicant: Halliburton Energy Services, Inc., Houston, TX (US)

(72) Inventors: Lay Wei Ang, Singapore (SG); Agustin Omictin Gubuan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/327,815

(22) PCT Filed: Sep. 26, 2014

(86) PCT No.: PCT/US2014/057761
§ 371 (c)(1),
(2) Date: Jan. 20, 2017

(87) PCT Pub. No.: WO2016/048362
PCT Pub. Date: Mar. 31, 2016

(65) Prior Publication Data
US 2017/0207511 A1    Jul. 20, 2017

(51) Int. Cl.
*H01Q 1/04*    (2006.01)
*E21B 47/12*    (2012.01)
(Continued)

(52) U.S. Cl.
CPC ............... *H01Q 1/04* (2013.01); *E21B 47/00* (2013.01); *E21B 47/121* (2013.01);
(Continued)

(58) Field of Classification Search
CPC ............ H01Q 1/04; H01Q 1/08; H01Q 1/088; H01Q 1/1235; H01Q 7/00; H01Q 7/005;
(Continued)

(56) References Cited

U.S. PATENT DOCUMENTS

| | | | | | |
|---|---|---|---|---|---|
| 2,144,310 | A | * | 1/1939 | Hyland | H01Q 7/04 29/602.1 |
| 2,147,148 | A | * | 2/1939 | Charrier | H01Q 7/04 343/764 |
| 2,485,654 | A | * | 10/1949 | Pickles | H01Q 7/04 343/743 |
| 4,121,219 | A | * | 10/1978 | O'Connor | H01Q 9/265 343/741 |
| 4,785,247 | A | * | 11/1988 | Meador | E21B 47/011 324/338 |

(Continued)

FOREIGN PATENT DOCUMENTS

| AU | 2003246336 A1 | 9/2003 |
|---|---|---|
| CN | 103038444 A | 4/2013 |
| WO | WO 2011/141173 A2 | 11/2011 |

OTHER PUBLICATIONS

International Search Report and the Written Opinion of the International Search Authority, or the Declaration, dated Jul. 15, 2015, PCT/US2014/057761, 12 pages, ISA/KR.

*Primary Examiner* — Jeff W Natalini
*Assistant Examiner* — Steven L Yeninas
(74) *Attorney, Agent, or Firm* — Haynes and Boone, LLP

(57) ABSTRACT

Pre-formed non-flexible antenna modules are connected to one another via radio-frequency ("RF") connectors for downhole applications. The antennas include two or more non-flexible antenna modules having a one or more center conductors extending therethrough. The antenna modules are connected by high frequency RF connectors, thereby forming a single antenna. Accordingly, the illustrative embodiments described herein will reduce the assembly complexity, increase repeatability of the design implementation, and enhance the productivity of the manufacturing process.

15 Claims, 4 Drawing Sheets

(51) Int. Cl.
*E21B 47/00* (2012.01)
*E21B 49/00* (2006.01)
*G01V 3/30* (2006.01)

(52) U.S. Cl.
CPC ............ *E21B 47/122* (2013.01); *E21B 49/00* (2013.01); *G01V 3/30* (2013.01)

(58) Field of Classification Search
CPC .. H01Q 7/02; H01Q 7/04; G01V 3/28; G01V 3/30; G01V 2003/084; E21B 47/00; E21B 47/12; E21B 47/122; E21B 49/00; E21B 17/028; H01R 9/034–9/038; H01R 9/05; H01R 9/0503; H01R 9/0512
USPC ......... 324/332–344; 343/741–744, 790–791, 343/842, 866–870; 340/854.4, 854.5, 340/855.1; 439/578, 579, 916
See application file for complete search history.

(56) References Cited

U.S. PATENT DOCUMENTS

| | | | |
|---|---|---|---|
| 5,661,402 A | 8/1997 | Chesnutt et al. | |
| 8,174,265 B2 | 5/2012 | Bittar et al. | |
| 8,574,006 B2* | 11/2013 | Gilliam | H01R 13/6581 439/578 |
| 9,181,798 B2* | 11/2015 | Palaghita | E21B 17/028 |
| 2005/0056419 A1 | 3/2005 | Hosie et al. | |
| 2005/0285752 A1* | 12/2005 | Hall | E21B 17/028 340/854.8 |
| 2006/0151179 A1 | 7/2006 | Boyadjieff et al. | |
| 2012/0176138 A1 | 7/2012 | Prammer | |
| 2013/0106615 A1* | 5/2013 | Prammer | G01V 3/30 340/854.6 |
| 2016/0049718 A1* | 2/2016 | Mueller | H01Q 1/22 343/720 |

* cited by examiner

PREFORMED ANTENNA WITH RADIO FREQUENCY CONNECTORS FOR DOWNHOLE APPLICATIONS

PRIORITY

The present application is a U.S. National Stage patent application of International Patent Application No. PCT/US2014/057761, filed on Sep. 26, 2014, the benefit of which is claimed and the disclosure of which is incorporated herein by reference in its entirety.

FIELD OF THE DISCLOSURE

The present disclosure generally relates to downhole interrogation tools and, more particularly, to electromagnetic antennas used to acquire downhole data.

BACKGROUND

The propagation of electromagnetic waves through the formation has been used for many years by the oil and gas industry to sense and detect formation properties, as well as for the transmission of data and communications. In order to do this, downhole tools (e.g., logging tools) use electromagnetic antennas to transmit and receive the signals. Conventional use antennas use flexible electrically-conductive wires housed in a cable-like strip. During assembly of the downhole tool, the antenna may be formed into a circular shape by aligning it into a groove along the circumference of the tool collar.

Conventional antennas are fraught with design challenges in actual implementation. First, fabricating the antenna can be difficult. Since the antennas are flexible, it is impossible to keep the center conductor exactly in the center of the antenna. The stray capacitance between the center conductor and the ground outer shield is proportional to the distance between the center conductor and the ground shield. The inability to control this distance causes the performance of the antenna to be inconsistent, even within the same manufacturing batch. The process of forming the antenna into the circular shape also causes this distance to change, further changing the performance of the antenna.

Moreover, for applications with multiple center conductors, conventional approaches require the operator to decipher which wire joins to which, and then to manually solder the connections. This process is potentially tedious and time-consuming, and occasionally leads to errors. Joining the wrong electrically-conductive wires together changes the characteristics of the antenna significantly, to the point that the tool may even malfunction during use. Therefore, the existing antenna design and installation process may have an above-average rejection rate as compared to other manufacturing processes, in part due to the inherent design challenges.

Therefore, there is a need in the art to provide alternative, reliable and less complex antenna design and installation process.

DESCRIPTION OF ILLUSTRATIVE EMBODIMENTS

Illustrative embodiments and related methods of the present disclosure are described below as they might be employed pre-formed electromagnetic sensors for downhole applications. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments of the present disclosure are directed to pre-formed electromagnetic antennas with radio-frequency ("RF") connectors for downhole applications. In a generalized illustrative embodiment, the antenna includes two non-flexible antenna modules having a center conductor extending therethrough. The two non-flexible antenna modules are connected by high frequency RF connectors, thereby forming a single antenna. In alternate embodiments, the antennas may be made up of more than two non-flexible modules, each being connected by RF connectors. Also, in other embodiments, each module may include more than one center conductor extending therethrough. Accordingly, the illustrative embodiments described herein will reduce the assembly complexity, increase repeatability of the design implementation, and enhance the productivity of the manufacturing process.

Figure 1:
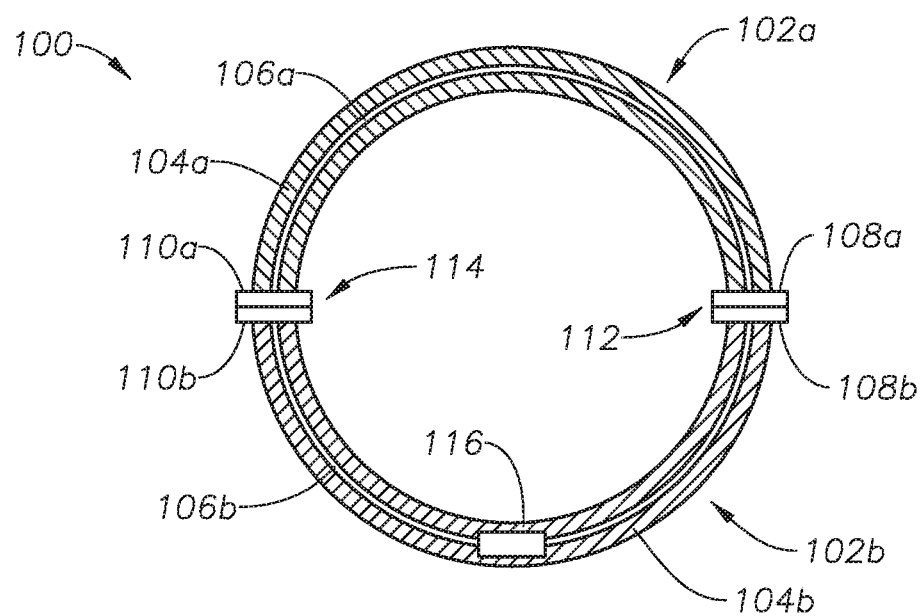
FIG. 1 illustrates an electromagnetic antenna in accordance to certain illustrative embodiments of the present disclosure.

FIG. 1 illustrates an electromagnetic antenna in accordance to certain illustrative embodiments of the present disclosure. Antenna 100 includes a first non-flexible antenna is module 102a and a second non-flexible antenna module 102b. In this embodiment, first and second non-flexible antenna modules 102a,102b are semicircular in shape, however other the antenna may take other shapes in alternate embodiments. First and second non-flexible antenna modules 102a,b each include a non-flexible/rigid housing 104a, b, which may be treated by a secondary process such as, for example, anodizing for rust resistant and/or coated with an insulation layer or non-conductive material such as, for example, Kemlox HT-2.

A center conductor 106a,b extends along housing 104a,b in order to communicate the electrical signals necessary to perform sensing operations. In certain embodiments, housings 104a,b are solid pieces in which center conductors 106a,b are positioned, thereby preventing movement of center conductors 106a,b inside housings 104a,b, and keeping the center conductors exactly in the center of the antenna. In other embodiments, however, housings 104a,b may be filled with an epoxy or resin in order to secure center conductors 106a,b in position. Nevertheless, first and second non-flexible antenna modules 102a,b each have a first end 108a,b and a second end 110a,b.

Still referring to FIG. 1, a first RF connector 112 connects first ends 108a and 108b together, and a second RF connector 114 connects second ends 110a and 110b together. First and second RF connectors 112,114 are impedance-controlled high frequency connectors (range of 1 Kilohertz to 500 Gigahertz, for example) formed of high temperature resistant material such as, for example, EC104 or high temperature epoxy such as HTE-5350. The control of the impedance is achieved by controlling the electrical properties of the materials in the connector. There is typically a "ground plane" which surrounds the center conductor and the distance between this plane and the center conductor must be controlled. The thickness and type of material for the conductive material is also tightly controlled from the entrance of the connector to the exit. In general, the thicker the material, the lower the resistance. However, there is skin effect which presents itself at high frequencies. When that happens, the surface area of the material becomes the more dominant factor. The imaginary component of impedance (i.e., reactance) will be heavily dependent on the insulation material properties between the center conductor and the "ground plane" and the distance between them. There are a variety of ways in which to design such a connector, and all such designs are envisioned within this disclosure.

Moreover, in this embodiment, a dielectric assembly 116 is positioned along second center conductor 106b in order to transmit and receive the electromagnetic signals. In other embodiments, however, dielectric assembly 116 may be positioned along first center conductor 106a. Once assembled, antenna 100 may be positioned along a downhole tool and operated in any suitable manner known in the art.

In an alternate embodiment, antenna 100 may include three or more non-flexible antenna modules. In such an embodiment (if three modules 102 were used), three RF connectors would be necessary to connect the modules end-to-end in like manner to that of antenna 100.

Figure 2A:
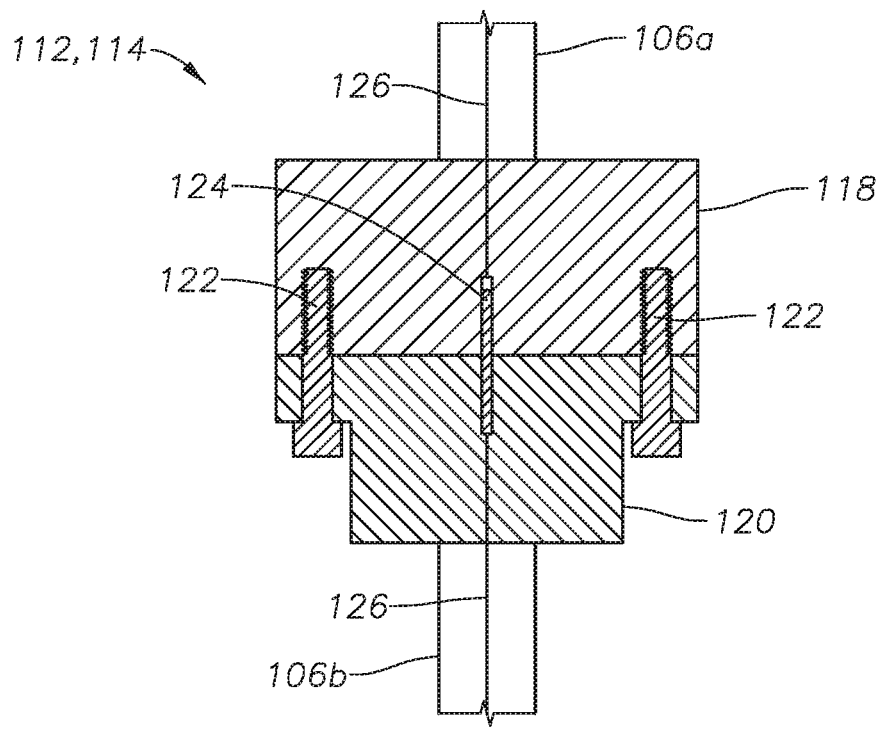
FIG. 2A is an exploded view of an RF connector utilizing a single center conductor, according to certain illustrative embodiments of the present disclosure.

FIG. 2A is an exploded view of an RF connector utilizing a single center conductor, according to certain illustrative embodiments of the present disclosure. Here, RF connectors 112,114 include a first connector piece 118 coupled to a second connector piece 120 via one or more fasteners 122. RF connectors 112,114 include a connector pin 124, which connects first and second center conductors 106a,b to one another via electrical wiring 126. Although not shown, RF connectors 112,114 may also include wiring necessary to connect to processing circuitry (e.g., control board) for control of the connectors.

Figure 2B:
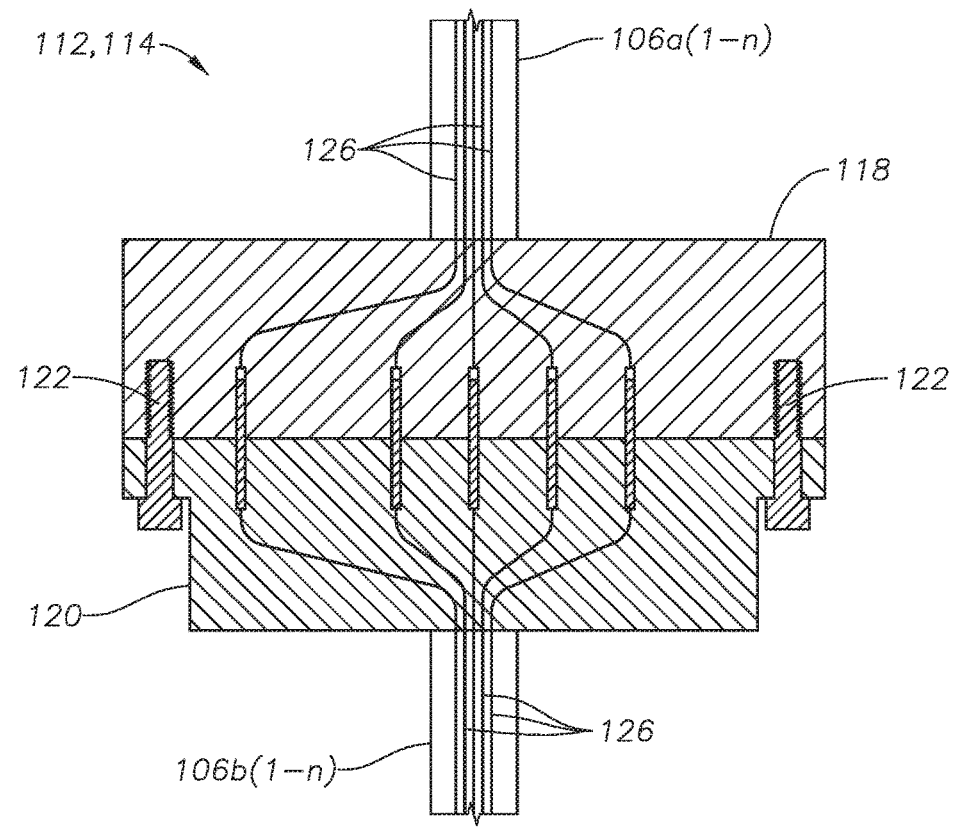
FIG. 2B is an exploded view of an RF connector utilizing a plurality of center conductors, according to certain illustrative embodiments of the present disclosure.

FIG. 2B is an exploded view of an RF connector utilizing a plurality of center conductors, according to certain illustrative embodiments of the present disclosure. RF connectors 112,114 of FIG. 2B are similar to the RF connectors of FIG. 2A, and thus are understood with reference thereto. However, in FIG. 2B, RF connectors 112,114 include connector pins 124(1-n), which connect center conductors 106a(1-n) to center conductors 106b(1-n). As previously mentioned, conventional antennas with multiple center conductors must be manually connected, which is very tedious and time-consuming and ultimately leads to error-prone antennas. Using this embodiment of the present disclosure, however, the connector pins are automatically connected to one another correctly when connector pieces 118 and 120 are connected to one another via fasteners 122, thus eliminating the possibility of error and reducing installation times.

Figure 3A:
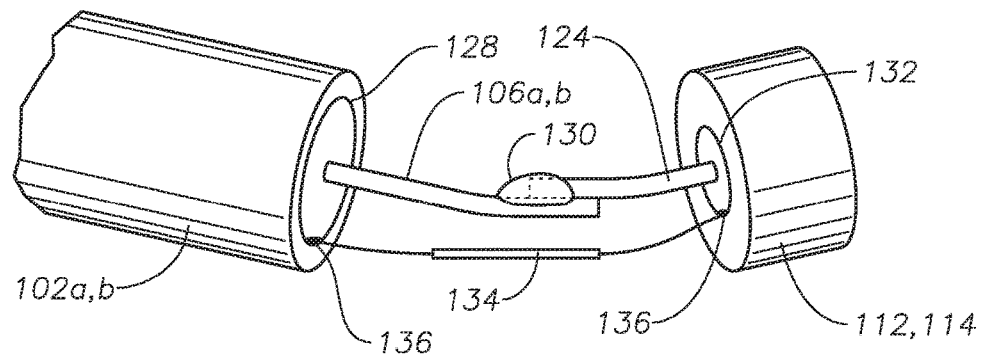
FIG. 3A illustrates a high level connection diagram for an antenna having a single center conductor, according to certain illustrative embodiments of the present disclosure.

FIG. 3A illustrates a high level connection diagram for an antenna having a single center conductor, according to certain illustrative embodiments of the present disclosure. Only one side of the connection between the center conductor and RF connector is shown for simplicity. Here, first and second non-flexible antenna modules 102a,102b include an outer shield 128 surrounding center conductors 106a,b. Center conductor 106a,b is connected to connector pin 124 in a suitable way, such as, for example, a solder or crimp joint 130. RF connectors 112,114 include a connector shield 132 surrounding connector pin 124. Outer shield 128 is connected to connector shield 132 via some suitable connection 134, such as, for example, an electrical wire or wire mesh that physically surrounds each center core. This connection may also be achieved via, for example, a solder or crimp joints 136.

Figure 3B:
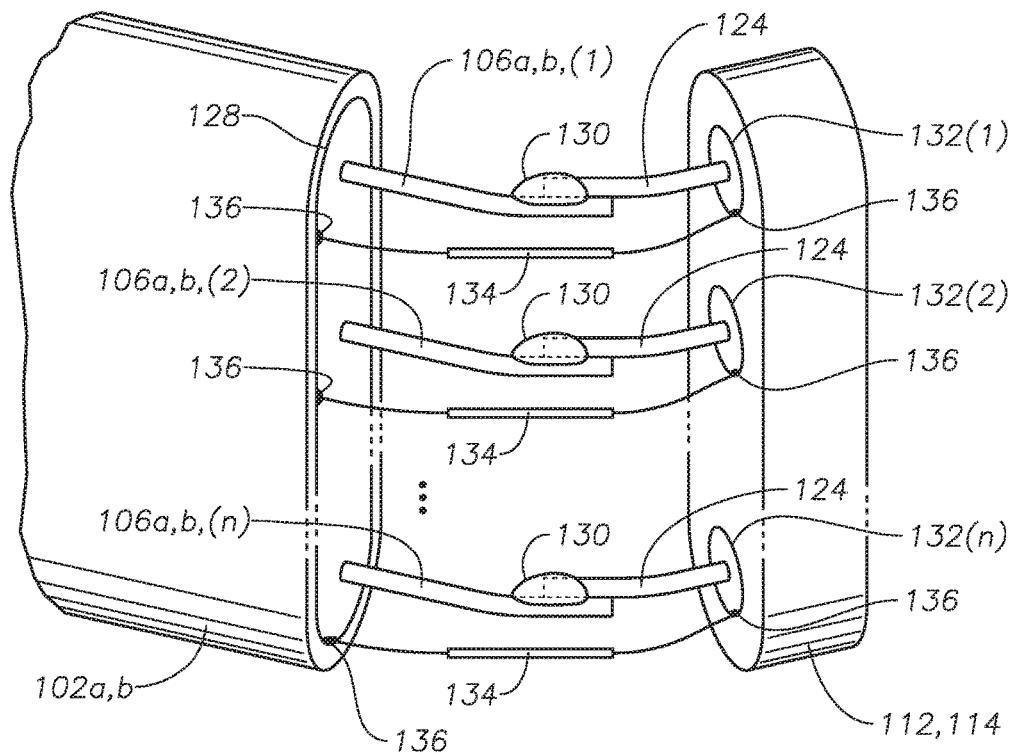
FIG. 3B illustrates a high level connection diagram for an antenna having a multiple center conductors, according to certain illustrative embodiments of the present disclosure.

FIG. 3B illustrates a high level connection diagram for an antenna having a multiple center conductors, according to certain illustrative embodiments of the present disclosure. As with FIG. 3A, only one side of the connection between the center conductors and RF connector is shown for simplicity. Like reference numerals refer to like elements. Here, however, first and second non-flexible antenna modules 102a,102b include an outer shield 128 surrounding multiple center conductors 106a,b(1-n). Center conductors 106a,b(1-n) are connected to connector pins 124 in a suitable way, such as, for example, a solder or crimp joints 130. RF connectors 112,114 include connector shields 132(1-n) surrounding connector pins 124. Outer shield 128 is connected to connector shields 132 (there is an individual shield 132 for each center conductor 106a,b(1-n)) via some suitable connection 134, such as, for example, an electrical wire or wire mesh that physically surrounds each center cores. This connection may also be achieved via, for example, a solder or crimp joints 136.

In addition to the foregoing design, there are many other ways in which to design the connection between first and second non-flexible antenna modules 102a,b. For example, in FIG. 3B, center conductor may have its individual shield between the antenna module and the connector. This would be the ideal implementation in terms of signal integrity and impedance control. In another example, multiple center conductors may share a common shield. This would be the optimized implementation in terms of space utilization and manufacturability.

Figure 4:
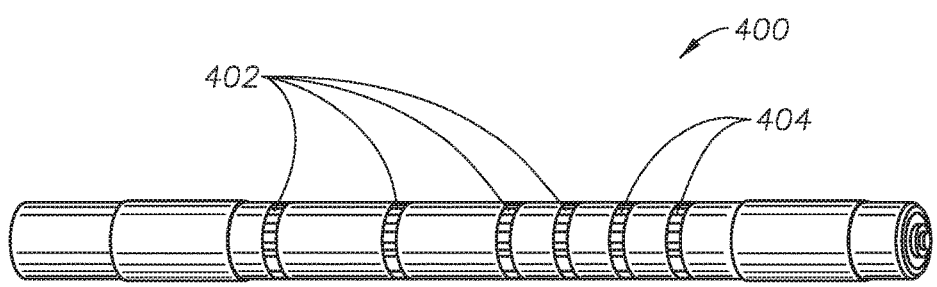
FIG. 4 illustrates a downhole logging tool fabricated in accordance to certain illustrative embodiments of the present disclosure.

During fabrication of antenna 100, first and second non-flexible antenna modules 102a,b are pre-formed such that the modules simply need to be connected via fasteners 122. Each module 102a,b is then connected and positioned along the body of a downhole tool. FIG. 4 illustrates a downhole logging tool 400, fabricated in accordance with certain illustrative embodiments of the present disclosure. Here, logging tool 400 includes transmitters 402 and receivers 404, each being the pre-formed antennas of the present disclosure. The logging tool 400 may then be positioned along a downhole assembly (wireline or drilling assembly, for example), and deployed downhole to conduct a wellbore operation.

Figure 5:
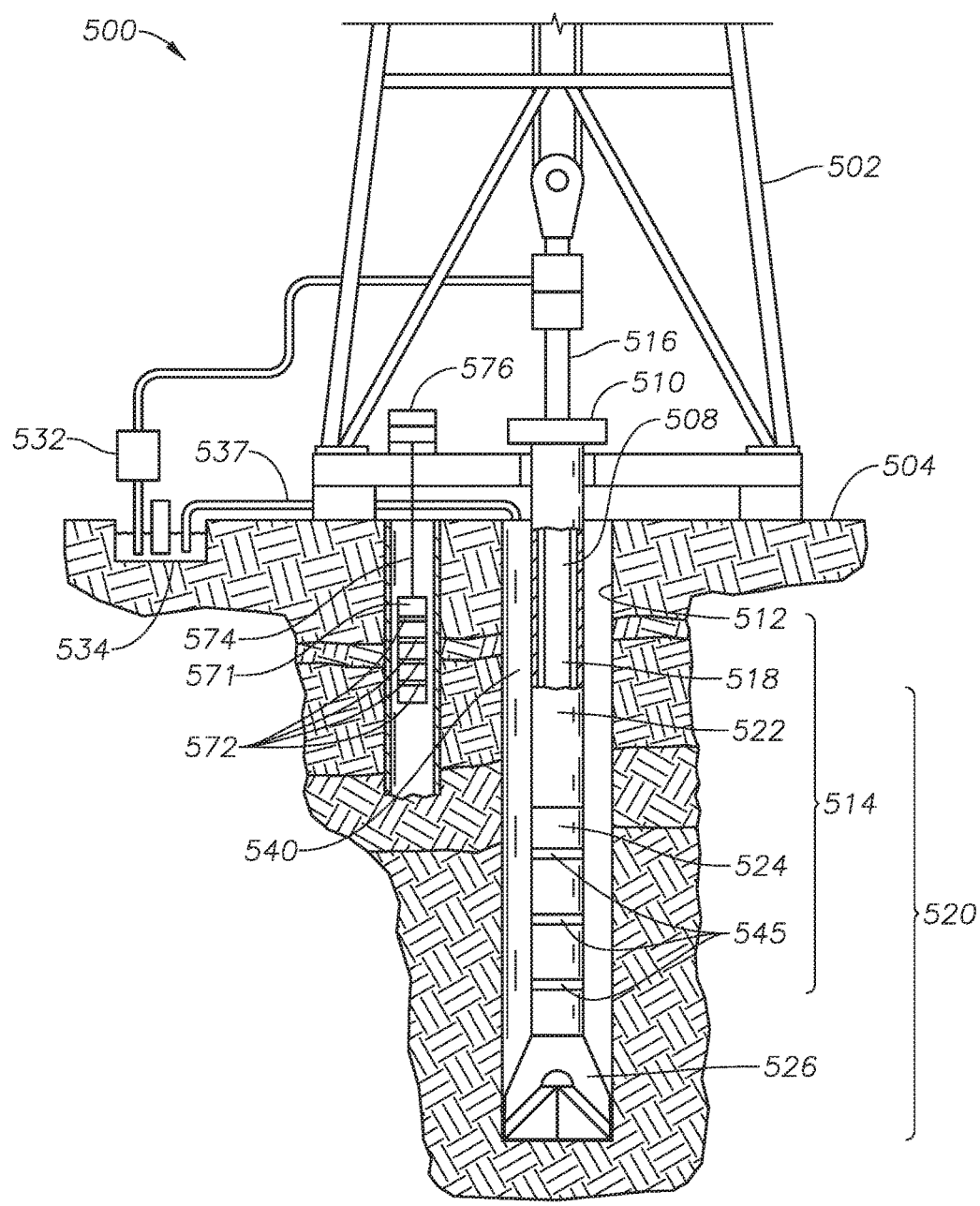
FIG. 5 illustrates a downhole logging tool deployed in a drilling and wireline application, according to certain illustrative methods of the present disclosure.

FIG. 5 illustrates a system 500 for drilling operations according to an illustrative embodiment of the present disclosure. It should be noted that the system 500 can also include a system for pumping or other operations. System 500 includes a drilling rig 502 located at a surface 504 of a wellbore. Drilling rig 502 provides support for a down hole apparatus, including a drill string 508. Drill string 508 penetrates a rotary table 510 for drilling a borehole/wellbore 512 through subsurface formations 514. Drill string 508 includes a Kelly 516 (in the upper portion), a drill pipe 518 and a bottom hole assembly 520 (located at the lower portion of drill pipe 518). In certain illustrative embodiments, bottom hole assembly 520 may include drill collars 522, a downhole tool 524 and a drill bit 526. Downhole tool 524 may be any of a number of different types of tools including measurement-while-drilling ("MWD") tools, logging-while-drilling ("LWD") tools, etc.

During drilling operations, drill string 508 (including Kelly 516, drill pipe 518 and bottom hole assembly 520) may be rotated by rotary table 510. In addition or alternative to such rotation, bottom hole assembly 520 may also be rotated by a motor that is downhole. Drill collars 522 may be used to add weight to drill bit 526. Drill collars 522 also optionally stiffen bottom hole assembly 520 allowing it to transfer the weight to drill bit 526. The weight provided by drill collars 522 also assists drill bit 526 in the penetration of surface 504 and subsurface formations 514.

During drilling operations, a mud pump 532 optionally pumps drilling fluid (e.g., drilling mud), from a mud pit 534 through a hose 536, into drill pipe 518, and down to drill bit 526. The drilling fluid can flow out from drill bit 526 and return back to the surface through an annular area 540 between drill pipe 518 and the sides of borehole 512. The drilling fluid may then be returned to the mud pit 534, for example via pipe 537, and the fluid is filtered. The drilling fluid cools drill bit 526, as well as provides for lubrication of drill bit 526 during the drilling operation. Additionally, the drilling fluid removes the cuttings of subsurface formations 514 created by drill bit 526.

Still referring to FIG. 5, downhole tool 524 may include one to a number of electromagnetic antennas 545 as described herein, which monitor different downhole parameters and generate data that is stored within one or more different storage mediums within the downhole tool 524. Alternatively, however, the data may be transmitted to a remote location (e.g., surface) and processed accordingly. Such parameters may include logging data related to the various characteristics of the subsurface formations (such as resistivity, radiation, density, porosity, etc.) and/or the characteristics of the borehole (e.g., size, shape, etc.), etc.

FIG. 5 also illustrates an alternative embodiment in which a wireline system 570 is deployed. In such an embodiment, wireline system 570 may include a downhole tool body 571 coupled to a base 576 by a logging cable 574. Logging cable 574 may include, but is not limited to, a wireline (multiple power and communication lines), a mono-cable (a single conductor), and a slick-line (no conductors for power or communications). Base 576 is positioned above ground and optionally includes support devices, communication devices, and computing devices. Tool body 571 houses any number of electromagnetic antennas 572 as described herein. In an embodiment, a power source (not shown) is positioned in tool body 571 to provide power to the tool 571. In operation, wireline system 570 is typically sent downhole after the completion of a portion of the drilling. More specifically, drill string 508 creates borehole 512, then drill string 508 is removed, and wireline system 570 is inserted into borehole 512.

Accordingly, by integrating the high temperature RF connectors with the non-flexible antenna modules, embodiments of the current disclosure provide an antenna that is easy to manufacture, install and replace. The performance of the antenna would be tightly controlled and not operator-dependent. The antenna pre-baking process, which could last 6-10 hours before installation would be eliminated. The scrap rate from handling and damaging the center conductors of the antenna would be eliminated. The epoxy process, which lasts 6-12 hours, for holding the antenna in place would be eliminated. The entire antenna installation and testing process would take roughly 10 minutes instead of two days. Fallout rate is expected to drop from more than 50% to below 1%. Since the antenna shape is pre-formed and non-flexible, the antenna characteristics are stable and not prone to change with operator handling. The antenna performance, which is highly sensitive to the size and shape of the antenna loop, will be tightly controlled, repeatable and consistent on every tool and job.

Embodiments and methods described herein further relate to any one or more of the following paragraphs:

1. An antenna for a downhole tool comprising a first non-flexible antenna module comprising a first center conductor that extends from a first end of the first non-flexible antenna is module to an opposite second end of the first non-flexible antenna module; a second non-flexible antenna module comprising a second center conductor that extends from a first end of the second non-flexible antenna module to an opposite second end of the second non-flexible antenna module; a first radiofrequency ("RF") connector coupling the first ends of the first and second non-flexible antenna modules to one another; and a second RF connector coupling the second ends of the first and second non-flexible antenna modules to one another.
2. An antenna as defined in paragraph 1, wherein the first and second non-flexible antenna modules are semi-circular in shape, thereby forming a circular shaped antenna.
3. An antenna as defined in paragraphs 1 or 2, further comprising a dielectric assembly positioned along at least one of the first or second non-flexible antenna modules.
4. An antenna as defined in any of paragraphs 1-3, wherein the first and second RF connectors have an operational frequency of in a range of approximately 1 Kilohertz to 500 Gigahertz.
5. An antenna as defined in any of paragraphs 1-4, wherein the first and second non-flexible antenna modules further comprise an outer shield surrounding the first and second center conductors; and the first and second RF connectors comprise: a connector pin which connects to the first and second center conductors; and a connector shield surrounding the connector pin, the connector shield being connected to the outer shield of the first and second non-flexible antenna modules.
6. An antenna as defined in any of paragraphs 1-5, wherein the first and second non-flexible antenna modules further comprise: a plurality of center conductors; and an outer shield surrounding each of the center conductors; and the first and second RF connectors comprise: a plurality of connector pins which each connect to one of the center conductors; and a connector shield surrounding each connector pin, the connector shields each being connected to one of the outer shields of the first and second non-flexible antenna modules.

7. An antenna as defined in any of paragraphs 1-6, wherein the antenna is positioned along the body of a downhole tool.

8. An antenna as defined in any of paragraphs 1-7, wherein the downhole tool forms part of a wireline or drilling assembly.

9. An antenna for a downhole tool, comprising: three or more non-flexible antenna modules, each comprising a center conductor that extends through the non-flexible antenna modules; and radio frequency ("RF") connectors coupling the non-flexible antenna modules end-to-end.

10. An antenna as defined in paragraph 9, wherein the non-flexible antenna modules are semi-circular in shape, thereby forming a circular shaped antenna.

11. An antenna as defined in paragraphs 9 or 10, wherein each non-flexible antenna module comprises a plurality of center conductors extending therethrough.

12. An antenna as defined in any of paragraphs 1-11, wherein the antenna is positioned along a downhole tool.

13. A method, comprising deploying a downhole tool into a wellbore, the downhole tool comprising at least one antenna as defined in any of claims 1-12; and performing a downhole operation using the at least one antenna.

14. A method as defined in paragraph 13, wherein the downhole operation is a logging operation.

Although various embodiments and methodologies have been shown and described, the disclosure is not limited to such embodiments and methodologies and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. An antenna for a downhole tool, comprising:
a first non-flexible antenna module comprising a first center conductor and a first outer shield surrounding the first center conductor, wherein the first center conductor extends from a first end of the first non-flexible antenna module to an opposite second end of the first non-flexible antenna module;
a second non-flexible antenna module comprising a second center conductor and a second outer shield surrounding the second center conductor, wherein the second center conductor extends from a first end of the second non-flexible antenna module to an opposite second end of the second non-flexible antenna module;
a first radio frequency ("RF") connector comprising a first connector piece and a second connector piece, the first connector piece configured to couple to the second connector piece to couple the first ends of the first and second non-flexible antenna modules to one another; and
a second RF connector comprising a third connector piece and a fourth connector piece, the third connector piece configured to couple to the fourth connector piece to couple the second ends of the first and second non-flexible antenna modules to one another wherein each of the first and second RF connectors further comprise:
a connector pin configured to connect to the first and second center conductors; and
a connector shield surrounding the connector pin, the connector shield configured to connect to the first and second outer shields.

2. The antenna as defined in claim 1, wherein the first and second non-flexible antenna modules are semi-circular in shape, thereby forming a circular shaped antenna.

3. The antenna as defined in claim 1, further comprising a dielectric assembly positioned along at least one of the first or second non-flexible antenna modules.

4. The antenna as defined in claim 1, wherein the first and second RF connectors have an operational frequency of in a range of approximately 1 Kilohertz to 500 Gigahertz.

5. The antenna as defined in claim 1, wherein each connector shield comprises a wire mesh.

6. The antenna as defined in claim 1, wherein:
the first and second non-flexible antenna modules further comprise:
a plurality of center conductors; and
an outer shield surrounding each of the center conductors; and
each of the first and second RF connectors further comprise:
a plurality of connector pins which each connect to one of the center conductors; and
a connector shield surrounding each connector pin, the connector shields each being connected to one of the outer shields of the first and second non-flexible antenna modules.

7. The antenna as defined in claim 1, wherein the antenna is positioned along a body of a downhole tool.

8. The antenna as defined in claim 7, wherein the downhole tool forms part of a wireline or drilling assembly.

9. An antenna for a downhole tool, comprising:
three or more non-flexible antenna modules, each comprising a center conductor that extends through the non-flexible antenna modules and an outer shield surrounding the center conductor; and
radio frequency ("RF") connectors, each RF connector comprising a first connector piece and a second connector piece, the first connector piece configured to couple to the second connector piece to couple the non-flexible antenna modules end-to-end wherein each of the RF connectors further comprise:
a connector pin configured to connect the center conductors of two antenna modules; and
a connector shield surrounding the connector pin, the connector shield configured to connect the outer shields of two antenna modules.

10. The antenna as defined in claim 9, wherein the non-flexible antenna modules are semi-circular in shape and are configured to form a circular shaped antenna when each of the three or more non-flexible antenna modules are connected.

11. The antenna as defined in claim 9, wherein each non-flexible antenna module comprises a plurality of center conductors extending therethrough.

12. The antenna as defined in claim 9, wherein the antenna is positioned along a downhole tool.

13. The antenna as defined in claim 9, wherein each connector shield comprises a wire mesh.

14. A method comprising:
deploying a downhole tool comprising an antenna into a wellbore, wherein the antenna comprises:
a first non-flexible antenna module comprising a first center conductor and a first outer shield surrounding the first center conductor, wherein the first center conductor extends from a first end of the first non-flexible antenna module to an opposite second end of the first non-flexible antenna module;

a second non-flexible antenna module comprising a second center conductor and a second outer shield surrounding the second center conductor, wherein the second center conductor extends from a first end of the second non-flexible antenna module to an opposite second end of the second non-flexible antenna module;

a first radio frequency ("RF") connector comprising a first connector piece and a second connector piece, the first connector piece configured to couple to the second connector piece to couple the first ends of the first and second non-flexible antenna modules to one another; and a second RF connector comprising a third connector piece and a fourth connector piece, the third connector piece configured to couple to the fourth connector piece to couple the second ends of the first and second non-flexible antenna modules to one another wherein each of the first and second RF connectors further comprise:

a connector pin configured to connect to the first and second center conductors; and a connector shield surrounding the connector pin, the connector shield configured to connect to the first and second outer shields; and performing a downhole operation using the antenna.

15. The method as defined in claim 14, wherein the downhole operation is a logging operation.

* * * * *